(12) United States Patent
Kim et al.

(10) Patent No.: US 9,995,564 B2
(45) Date of Patent: Jun. 12, 2018

(54) TERMINAL AND SERVER FOR MODIFYING MAGNETIC FIELD AND METHOD THEREOF

(71) Applicant: Samsung Electronics Co., Ltd., Suwon-si (KR)

(72) Inventors: Seong Eun Kim, Suwon-si (KR); Yong Kim, Seoul (KR); Eung Sun Kim, Suwon-si (KR); Hyun Gi Ahn, Incheon (KR); Ji Hyun Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 819 days.

(21) Appl. No.: 13/948,717

(22) Filed: Jul. 23, 2013

(65) Prior Publication Data

US 2014/0025334 A1    Jan. 23, 2014

(30) Foreign Application Priority Data

Jul. 23, 2012  (KR) .................. 10-2012-0079971

(51) Int. Cl.
*G01C 9/00* (2006.01)
*G01B 7/14* (2006.01)
*H04W 64/00* (2009.01)
*G01V 3/00* (2006.01)

(52) U.S. Cl.
CPC ............. *G01B 7/14* (2013.01); *G01V 3/00* (2013.01); *H04W 64/00* (2013.01)

(58) Field of Classification Search
CPC ............ G01B 7/14; G01V 3/00; H04W 64/00
USPC ........................................ 702/150
See application file for complete search history.

(56) References Cited

U.S. PATENT DOCUMENTS

| 7,890,262 B2 | 2/2011 | Judd et al. | |
| 8,712,686 B2 * | 4/2014 | Bandyopadhyay .... | G01C 17/38 701/445 |
| 2004/0123474 A1 * | 7/2004 | Manfred ................ | G01C 17/38 33/352 |
| 2006/0244446 A1 | 11/2006 | Dewdney et al. | |
| 2008/0077326 A1 * | 3/2008 | Funk .................... | G01C 21/165 701/500 |
| 2012/0143495 A1 * | 6/2012 | Dantu ................. | G01C 21/206 701/428 |

(Continued)

FOREIGN PATENT DOCUMENTS

| JP | 2001-42934 A | 2/2001 |
| JP | 2005-300896 A | 10/2005 |

(Continued)

*Primary Examiner* — Toan Le
*Assistant Examiner* — Xiuquin Sun
(74) *Attorney, Agent, or Firm* — NSIP Law (57) ABSTRACT

A method of estimating a location of a terminal includes measuring a magnetic field value at a location of the terminal, estimating the location of the terminal using the measured magnetic field value, and transmitting the measured magnetic field value and information associated with the estimated location to a server. A method of modifying a magnetic field map includes receiving, from a terminal, a magnetic field value estimated at a location of the terminal, and information associated with a location of the terminal estimated based on the magnetic field value, and modifying a magnetic field map using the measured magnetic field value and the information associated with the estimated location.

9 Claims, 9 Drawing Sheets

(56) References Cited

U.S. PATENT DOCUMENTS

2013/0045751 A1* 2/2013 Chao .................... G01C 21/206
455/456.1
2013/0096817 A1* 4/2013 Fauci .................... H04W 4/043
701/411
2013/0303878 A1* 11/2013 Nevo .................... A61B 5/062
600/409

FOREIGN PATENT DOCUMENTS

| KR | 10-2005-0046298 A | 5/2005 |
| KR | 10-0506097 B1 | 7/2005 |
| KR | 10-2012-0000353 A | 1/2012 |

* cited by examiner

TERMINAL AND SERVER FOR MODIFYING MAGNETIC FIELD AND METHOD THEREOF

CROSS-REFERENCE TO RELATED APPLICATIONS

This application claims the benefit under 35 USC 119(a) of Korean Patent Application No. 10-2012-0079971 filed on Jul. 23, 2012, in the Korean Intellectual Property Office, the disclosure of which is incorporated herein by reference in its entirety for all purposes.

BACKGROUND

1. Field

The following description relates to a user terminal and a server for modifying a magnetic field map and a method thereof.

2. Description of Related Art

A method of estimating a location using a mobile communication signal may approximate a location of a terminal, that is, may employ a proximity method using a location of a cellular base station to which a portable terminal enabled with mobile communication is connected, and perform triangulation by measuring a transmission distance of a signal to at least three base stations that are adjacent to the terminal.

A method of estimating a location using a local area network (LAN) may approximate a location of a terminal using a location of an access point (AP) belonging to a wireless LAN terminal, or estimate the location of the terminal by performing pattern matching with a previously recorded fingerprint map through measuring a signal strength of an adjacent AP.

A method of estimating a location using an ultra-wide band (UWB) may perform triangulation by measuring a distance to an AP that generates UWB signal.

A method of estimating a location using a magnetic field map may calculate a location of a terminal by measuring a magnetic field at the location of the terminal. Representative algorithms may include a Kalman filter, a particle filter, a Markov localization, and similar algorithms. The aforementioned algorithms may measure environmental variables that undergo various changes as the terminal moves, and based on a result of the measurement, the location of the terminal may be estimated continuously.

SUMMARY

In one general aspect, a method of estimating a location of a terminal includes measuring a magnetic field value at a location of a terminal; estimating the location of the terminal using the measured magnetic field value; and transmitting the measured magnetic field value and information associated with the estimated location to a server.

The estimating of the location of the terminal may include estimating the location of the terminal using a magnetic field value corresponding to the location of the terminal on a magnetic field map and the measured magnetic field value.

The method may further include requesting permission to collect the information associated with the estimated location when a difference between the magnetic field value on the magnetic field map and the measured magnetic field value is greater than a predetermined threshold value.

The method may further include determining whether the location of the terminal is estimated correctly based on the information associated with the estimated location.

The determining of whether the location of the terminal is estimated correctly may include determining whether the location of the terminal is estimated correctly based on whether a difference between the magnetic field value on the magnetic field map and the measured magnetic field value is greater than a predetermined threshold value.

The method may further include receiving an input of the location of the terminal from a user of the terminal when the location of the terminal is estimated incorrectly; and the transmitting of the information associated with the estimated location to a server may include transmitting the input location of the terminal and the measured magnetic field value to the server.

The method may further include determining whether the terminal stores a magnetic field map including the location of the terminal; requesting a map server for the magnetic field map including the location of the terminal when a result of the determination is that the terminal does not store the magnetic field map; and receiving the magnetic field map from the map server in response to the request.

The estimating of the location of the terminal may include estimating the location of the terminal using the measured magnetic field value and a magnetic field value corresponding to the location of the terminal on the received magnetic field map.

The estimating of the location of the terminal may include receiving a location of the terminal estimated in the server based on the measured magnetic field value.

The transmitting of the measured magnetic field value and the information associated with the estimated location to the server may include requesting permission from a user of the terminal to transmit the measured magnetic field value and the information associated with the estimated location to the server.

The method may further include providing a reward for transmitting the information associated with the estimated location to the server.

In another general aspect, a non-transitory computer-readable storage medium stores a program for controlling a computer to perform the method described above.

In another general aspect, a method of modifying a magnetic field map includes receiving, from a terminal, a magnetic field value estimated at a location of the terminal, and information associated with a location of the terminal estimated based on the magnetic field value; and modifying a magnetic field map using the measured magnetic field value and the information associated with the estimated location.

The modifying of the magnetic field value may include comparing a magnetic field value corresponding to the location of the terminal on the magnetic field map with the information associated with the estimated location; and modifying the magnetic field value corresponding to the location of the terminal on the magnetic field map based on a result of the comparison.

The modifying of the magnetic field map may include resetting a parameter of a location estimating algorithm used for estimating the location of the terminal on the magnetic field map using the information associated with the estimated location.

The receiving of the information associated with the estimated location may include receiving a location input by a user of the terminal and the measured magnetic field value.

The modifying of the magnetic field map may include modifying the magnetic field map using the location input by the user of the terminal and the measured magnetic field value.

The modifying of the magnetic field map may include resetting a parameter of a location estimating algorithm used for estimating the location of the terminal on the magnetic field map using the location input by the user of the terminal and the measured magnetic field value.

In another general aspect, a terminal for estimating a location of the terminal includes a measuring unit configured to measure a magnetic field value at a location of the terminal; a processor configured to estimate the location of the terminal using the measured magnetic field value; and a network module configured to transmit the measured magnetic field value and information associated with the estimated location to a server.

The processor may be further configured to determine whether the location of the terminal is estimated correctly based on the information associated with the estimated location.

The terminal of claim may further include a touch display configured to display the estimated location of the terminal on a screen, and receive an input of the location of the terminal from a user of the terminal; and the network module may be further configured to transmit the input location of the terminal and the measured magnetic field value to the server.

In another general aspect, a server for modifying a magnetic field map includes a receiving unit configured to receive, from a terminal, a magnetic field value measured at a location of the terminal, and information associated with a location estimated based on the measured magnetic field value; and a processor configured to modify a magnetic field map using the measured magnetic field value and the information associated with the estimated location.

The processor may be further configured to compare a magnetic field value corresponding to the location of the terminal on the magnetic field map with the information associated with the estimated location, and modify the magnetic field value corresponding to the location of the terminal on the magnetic field map based on a result of the comparison.

The processor may be further configured to reset a parameter of a location estimating algorithm used for estimating the location of the terminal on the magnetic field map using the information associated with the estimated location.

The receiving unit may be further configured to receive a location input by a user of the terminal and the measured magnetic field value.

The processor may be further configured to modify the magnetic field map using the location input by the user of the terminal and the measured magnetic field value.

The processor may be further configured to reset a parameter of a location estimating algorithm used for estimating the location of the terminal on the magnetic field map using the location input by the user of the terminal and the measured magnetic field value.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 1:
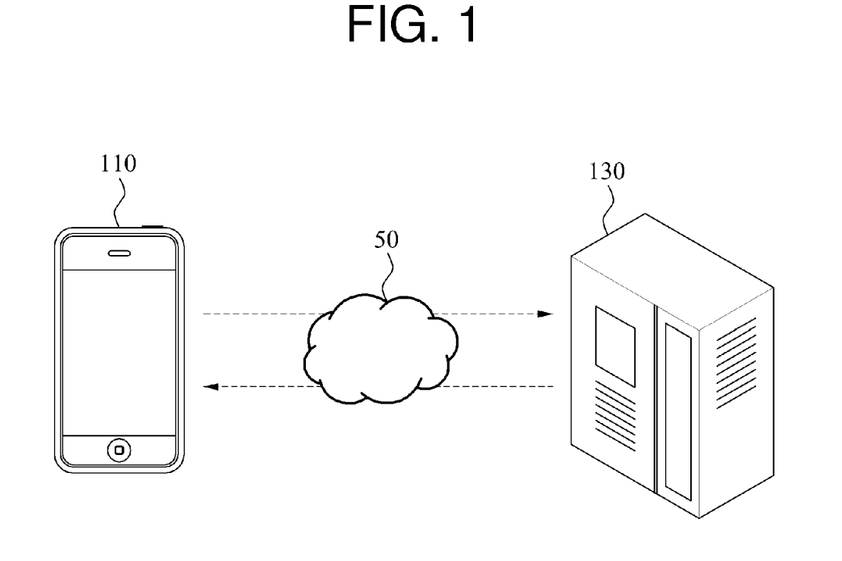
FIG. 1 is a diagram illustrating an example a system environment in which a method of modifying a magnetic field map is performed.

FIG. 1 is a diagram illustrating an example of a system environment in which a method of modifying a magnetic field map is performed. Referring to FIG. 1, the system environment in which the method of modifying the magnetic field map is performed includes a wired/wireless network 50 including the Internet, a user terminal 110, and a server 130. The user terminal 110 and the server 130 exchange information via the wired/wireless network 50.

The user terminal 110 may be a wireless terminal or a wired/wireless integrated terminal such as a mobile terminal including a smart phone, a Blackberry, a feature phone, and similar devices, a tablet device, a programmed data processor (PDP), a personal digital assistant (PDA), a laptop, and similar devices.

The user terminal 110 includes a magnetometer, a magnetic field sensor, or an Inertial Measurement Unit (IMU) sensor, and measures a magnetic field value at a location of the user terminal 110. The user terminal 110 includes an application that estimates the location of the user terminal 110 using the measured magnetic field value, and has a sufficient processing power to execute a corresponding application.

The application of the user terminal 110 that estimates the location of the user terminal 110 may be downloaded from the server 130, or obtained via another path.

Also, the user terminal 110 communicates with the server 130 to obtain a magnetic field map from the server 130, or provide a magnetic field value measured by the user terminal 110 to the server 130.

The server 130 is a wired, wireless, or wired/wireless integrated device and includes sufficient storage space for storing a magnetic field map of service area in which a location estimating service with respect to the user terminal 110 is provided. The server 130 provides the magnetic field map to the user terminal 110 upon request from the user terminal 110, and modifies the magnetic field map of the service area based on information including the measured magnetic field value transmitted from the user terminal 110. Although the term "server" is used for convenience in this description, any device that is capable of storing the magnetic field map of the service area, communicating with the user terminal 110, and modifying the magnetic field map of the service area based on information including the measured magnetic field value transmitted from the user terminal 110 may be used as the server 130.

The server 130 compares the magnetic field value measured at the location of the user terminal 110 and transmitted from the user terminal with the magnetic field map, and estimates the location of the user terminal 110 based on a result of the comparison.

The "magnetic field map" includes pre-measured magnetic field values at a plurality of locations included in a predetermined area, for example, an area in which a location of a terminal is to be estimated. The plurality of locations may be a plurality of locations separated by a predetermined interval, or may be a plurality of locations including only locations at which the magnetic field value is able to be measured, or locations that are reachable by the user terminal 110.

The plurality of locations may be locations in a three-dimensional (3D) space rather than in a two-dimensional (2D) space. For example, the user terminal 110 may be used for estimating a location such as indoors in a high-rise building, and similar environments. By way of example, a magnetic field is measured on each floor of a high-rise building at a fixed location on each floor, so that the location is displayed identically on a 2D floor plan. However, although the location on each floor may seem identical on the 2D floor plan, a height in the 3D space is different for each floor. Accordingly, the magnetic field value measured on each floor is distinctive.

Figure 2:
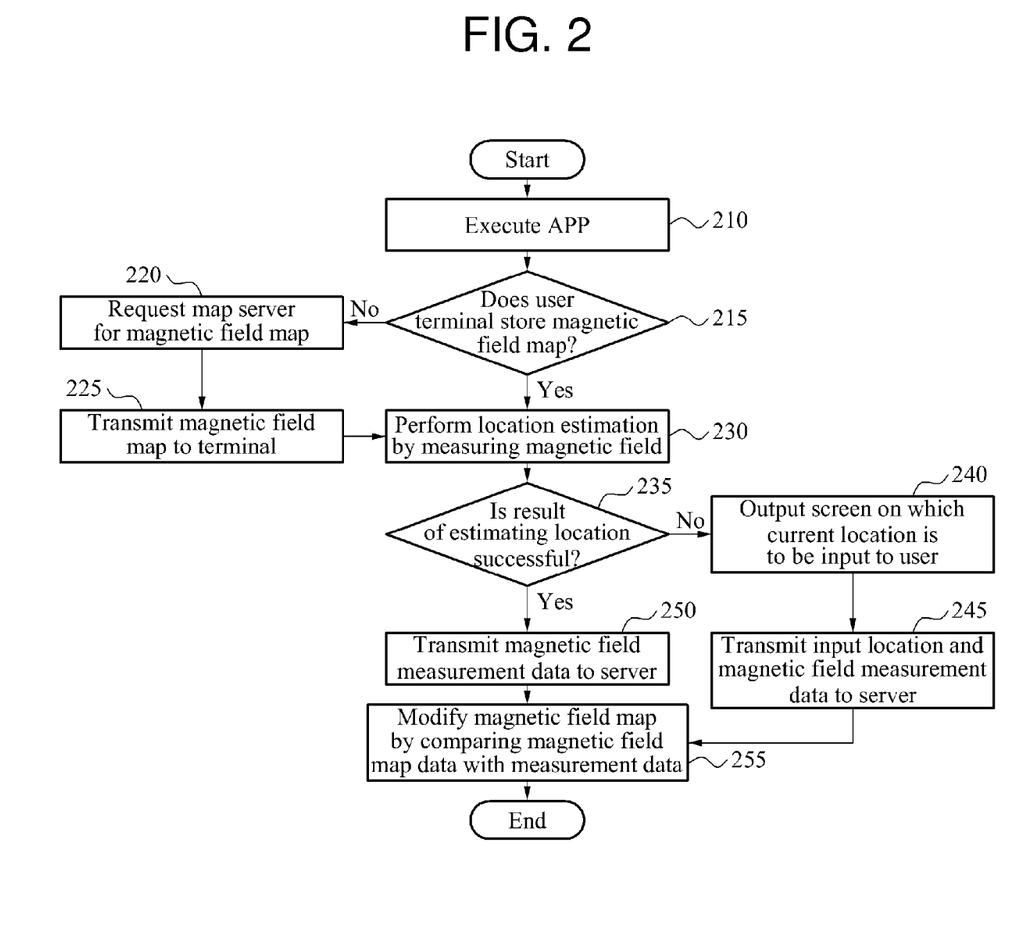
FIG. 2 is a diagram illustrating an example of a process of performing a method of modifying a magnetic field map between a user terminal and a server.

FIG. 2 is a diagram illustrating an example of a process of performing a method of modifying a magnetic field map between a user terminal and a server. In this example, a user terminal is provided with a location estimating service via an application, and obtaining an initial location for estimating the location of the user terminal is successful. Here, the "initial location, or a "first location" is a location of the user terminal or a user that is estimated for the first time to provide a positioning service with respect to the user terminal or the user. For example, the "initial location" may be a location of the user estimated when the user operates an application for providing the positioning service for the first time.

Referring to FIG. 2, as the application for estimating the location of the user terminal is executed in the user terminal in 210, the user terminal determines whether the user terminal stores a magnetic field map including the location of the user terminal in 215.

In 230, the user terminal measures a magnetic field value at the location of the user terminal, and performs an estimation of the location of the user terminal using the measured magnetic field value when the user terminal is determined to store the magnetic field map including the location of the user terminal in 215.

In 220, the user terminal requests a map server for the magnetic field map including the location of the user terminal when the user terminal is determined not to store the magnetic field map including the location of the user terminal in 215. The map server and a server that modifies the magnetic field map may be the same server, or may be different servers.

In response to the request in 220, in 225, the map server transmits the magnetic field map to the user terminal, and accordingly, in 230, the user terminal performs an estimation of the location of the user terminal using the magnetic field map transmitted in 225 and the measured magnetic field value.

In 235, the user terminal determines whether a result of estimating the location of the user terminal is successful based on information associated with the estimated location. In 250, the user terminal transmits magnetic field measurement data to the server when the result of the estimation is determined to be successful in 235.

In 255, the server that receives the magnetic field measurement data compares data of the magnetic field map stored in a database or other storage location, that is, the magnetic field value on the magnetic field map, with data of the magnetic field measured in the user terminal, for example, the measured magnetic field value, and modifies the magnetic field map based on a result of the comparison.

In 240, the user terminal outputs a screen on which a current location of the user is to be input, and receives an input of the current location of the user terminal from the user, when the result of the estimation is determined to be unsuccessful in 235.

Subsequently, in 245, the user terminal transmits the location of the user terminal that is input in 240 and the magnetic field measurement data to the server. Subsequently, in 255, the server modifies the magnetic field map using the location of the user terminal that is input in 240 and the data of the magnetic field map stored in the database or other storage location in lieu of the data of the measured magnetic field.

For example, the server may modify the magnetic field map based on the following Equation 1.

$$D\{M_{x,y}(B_x, B_y, B_z), P_{x,y}(B_x, B_y, B_z)\} \geq \eta \qquad (1)$$

In Equation 1, D denotes a Euclidean distance, $M_{x,y}(B_x, B_y, B_z)$ denotes a magnetic field value ($B_x$, $B_y$, $B_z$) at a specific point (x, y) on the magnetic field map, $P_{x,y}(B_x, B_y, B_z)$ denotes a magnetic field value actually estimated at the specific point (x, y), and η denotes a predetermined threshold value.

That is, according to Equation 1, when a difference between the magnetic field value on the magnetic field map and the measured magnetic field value is greater than or equal to the predetermined threshold value, the server modifies the magnetic field map. Alternatively, the server may modify the magnetic field map when the difference between the magnetic field value on the magnetic field map and the measured magnetic field value is greater than the predetermined threshold value, in which case "≥" in Equation 1 would be replaced with ">".

The server modifies and supplements the magnetic field map with respect to a point at which a difference between the magnetic field map and information collected by the user terminal is great by collecting and analyzing data or information provided from the user terminal.

For example, when modifying the magnetic field map in 255, the server may use an average value of measurement data received from the user terminal.

Figure 3:
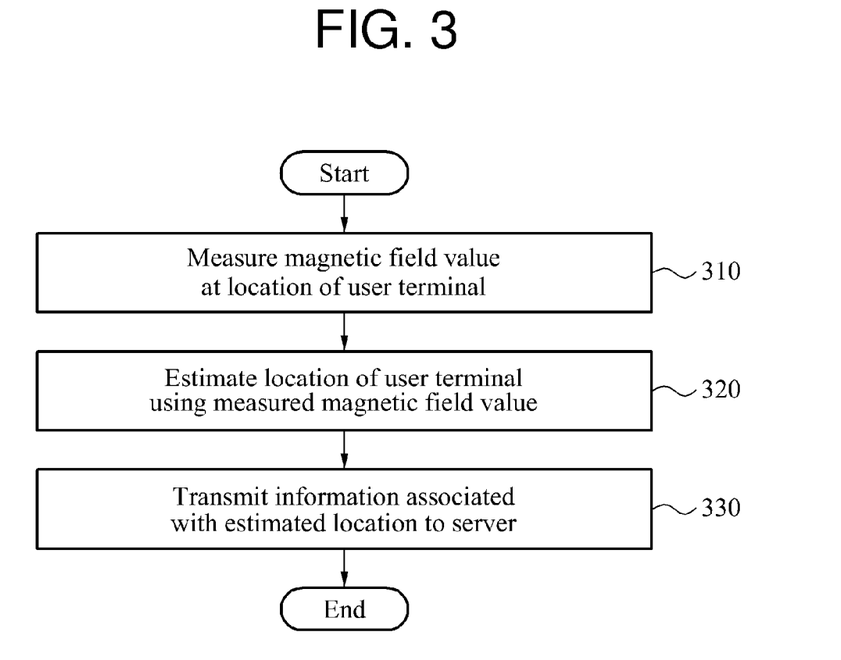
FIG. 3 is a flowchart illustrating an example of a process of performing a method of modifying a magnetic field map in a user terminal.

FIG. 3 is a flowchart illustrating an example of a process of performing a method of modifying a magnetic field map in a user terminal. Referring to FIG. 3, in 310, a user terminal measures a magnetic field value at a location of the user terminal. For example, the user terminal may measure a magnetic field value at the location of the user terminal using a magnetometer, a magnetic field sensor, or a similar device.

In 320, the user terminal estimates the location of the user terminal using the measured magnetic field value. The user terminal estimates the location of the user terminal using a magnetic field value corresponding to the location of the user terminal on the magnetic field map and the magnetic field value measured in 310. That is, the user terminal compares a location having a magnetic field value ($B_x$, $B_y$, $B_z$) measured at a corresponding point with a location having the same magnetic field value on the magnetic field map, and estimates a location on the magnetic field map displaying the closest value as the location of the user terminal.

As a simple example, when the magnetic field value measured in the user terminal is "5", a point displaying a magnetic field value of "5" on the magnetic field map, or a point displaying the magnetic field value closest to "5", may be estimated to be a location of a corresponding user terminal.

In 330, the user terminal transmits information associated with the location estimated in 320 to a server. The user terminal transmits a magnetic field value measured in 310 along with the information associated with the estimated location to the server. Accordingly, the server may modify and supplement the magnetic field map using the information associated with the estimated location and the magnetic field value.

Figure 4:
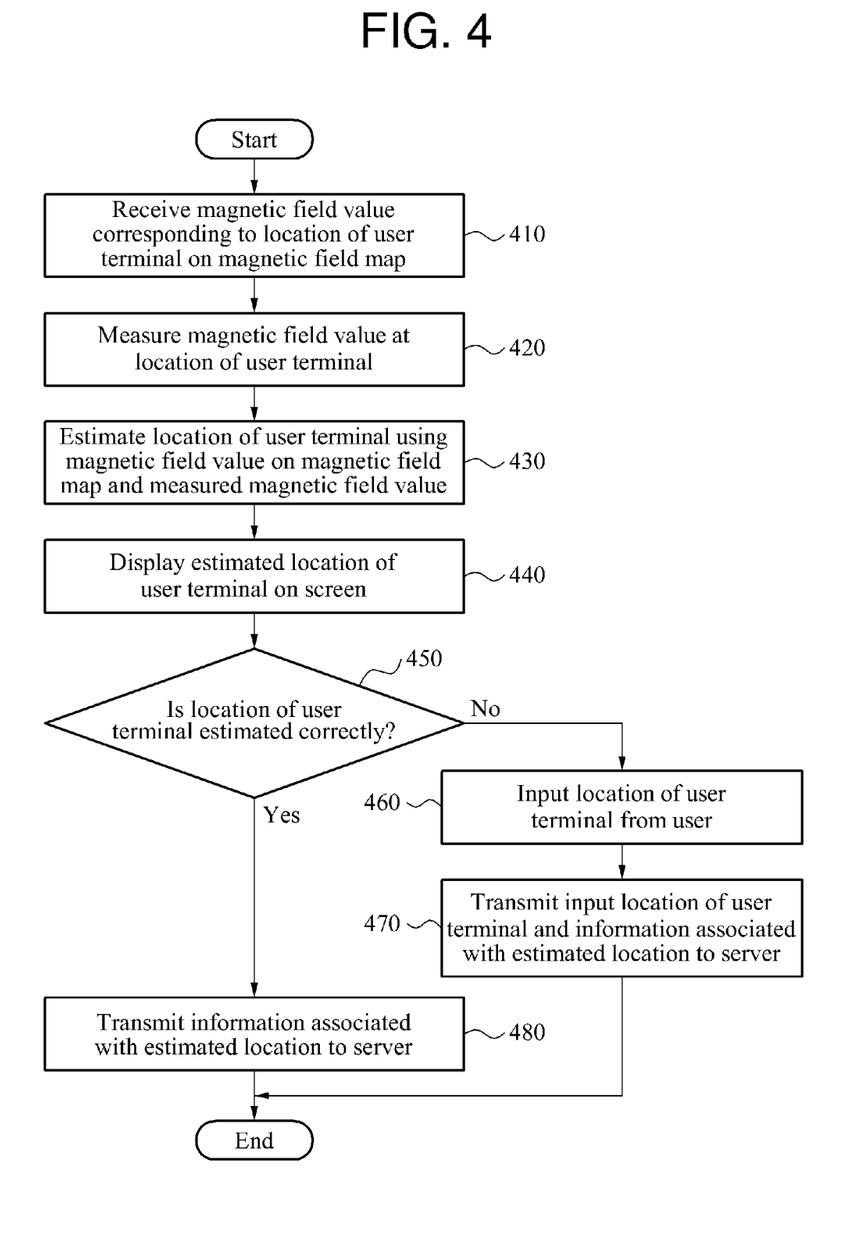
FIG. 4 is a flowchart illustrating another example of a process of performing a method of modifying a magnetic field map in a user terminal.

FIG. 4 is a flowchart illustrating another example of a process of performing a method of modifying a magnetic field map in a user terminal. Referring to FIG. 4, in 410, a user terminal receives a magnetic field value corresponding to a location of the user terminal on a magnetic field map from a server or a similar device.

In 420, the user terminal measures the magnetic field value at the location of the user terminal.

In 430, the user terminal estimates the location of the user terminal using the magnetic field value corresponding to the location of the user terminal on the magnetic field map and the measured magnetic field value.

In 440, the user terminal displays the estimated location of the user terminal. The user terminal may display the location of the user terminal on the magnetic field map or a general map.

In 450, the user terminal determines whether the location of the user terminal is estimated correctly based on information associated with the estimated location. The "information associated with the estimated location" may include the magnetic field value measured at the location of the user terminal.

The user terminal determines in 450 whether the location of the user terminal is estimated correctly based on whether a difference between the magnetic field value on the magnetic field map and the measured magnetic field value is greater than or equal to a predetermined threshold value.

In addition, the user terminal receives a response from a user as to whether the location of the user terminal displayed in 440 is correct, and based on response, determines whether the location of the user terminal is estimated correctly in operation 450.

In 480, the user terminal transmits the information associated with the estimated location to the server when the location of the user terminal is estimated correctly based on a result of the determination in 450. Accordingly, the server may modify stored magnetic field information or the magnetic field map using the information associated with the estimated location. The user terminal may request permission from the user to transmit the information associated with the estimated location to the server, or provide a reward for transmitting the information associated with the estimated location to the server.

In 460, the user terminal receives an input of the location of the user terminal from the user directly when the location of the user terminal is estimated incorrectly in 450.

The user terminal displays a map including the location of the user terminal on a screen such as a touch display or a similar device to receive the input of the location of the user terminal in 460. The user terminal receives the input of the location of the user terminal as the user touches or points to a specific location on the map displayed on the screen.

Subsequently, in 470, the user terminal transmits the location of the user terminal that is input in 460 and the magnetic field value measured in 420 to the server, and then ends the operation.

Figure 5:
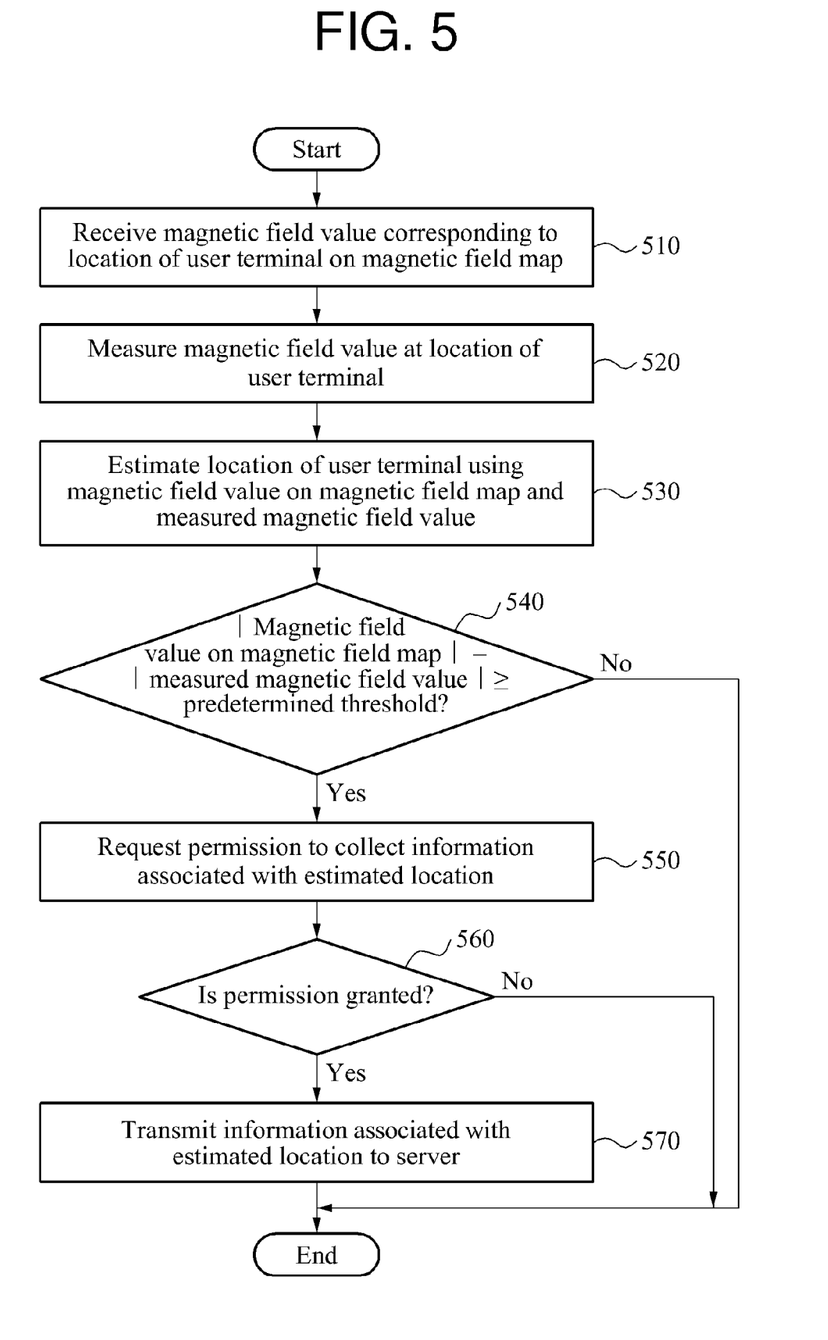
FIG. 5 is a flowchart illustrating another example of a process of performing a method of modifying a magnetic field map in a user terminal.

FIG. 5 is a flowchart illustrating another example of a process of performing a method of modifying a magnetic field map in a user terminal. Referring to FIG. 5, in 510, a user terminal receives a magnetic field value corresponding to a location of the user terminal on a magnetic field map from a server or a database or similar device.

In 520, the user terminal measures a magnetic field value at the location of the user terminal.

In 530, the user terminal estimates the location of the user terminal using the magnetic field value corresponding to the location of the user terminal on the magnetic field map and the measured magnetic field value.

In 540, the user terminal determines whether a difference between the magnetic field value on the magnetic field map and the measured magnetic field value is greater than or equal to a predetermined threshold value.

In 550, the user terminal requests permission from a user to collect information associated with the estimated location when a result of the determination in 540 is that the difference between the magnetic field value on the magnetic field map and the measured magnetic field value is greater than or equal to the predetermined threshold value. For example, the user terminal may display a pop-up window to request the permission from the user to collect the information, and receive a response, to obtain the permission.

The user terminal ends the operation without transmitting the information associated with the estimated location to the server when a result of the determination in 540 is that the difference between the magnetic field value on the magnetic field map and the measured magnetic field value is less than the predetermined threshold value. In this instance, since the difference between the magnetic field value actually measured at a corresponding location and the magnetic field value on the magnetic field map stored in the server is less than the predetermined threshold value, the difference is considered to be inconsequential, and accordingly there is no need to modify the magnetic field map stored in the server.

In 560, the user terminal determines whether the permission from the user is granted, and when the user grants the permission, in 570, the user terminal transmits the information associated with the estimated location to the server.

However, when the user does not grant the permission in 560, the user terminal does not transmit the information associated with the estimated location to the server, and ends the operation immediately.

Figure 6:
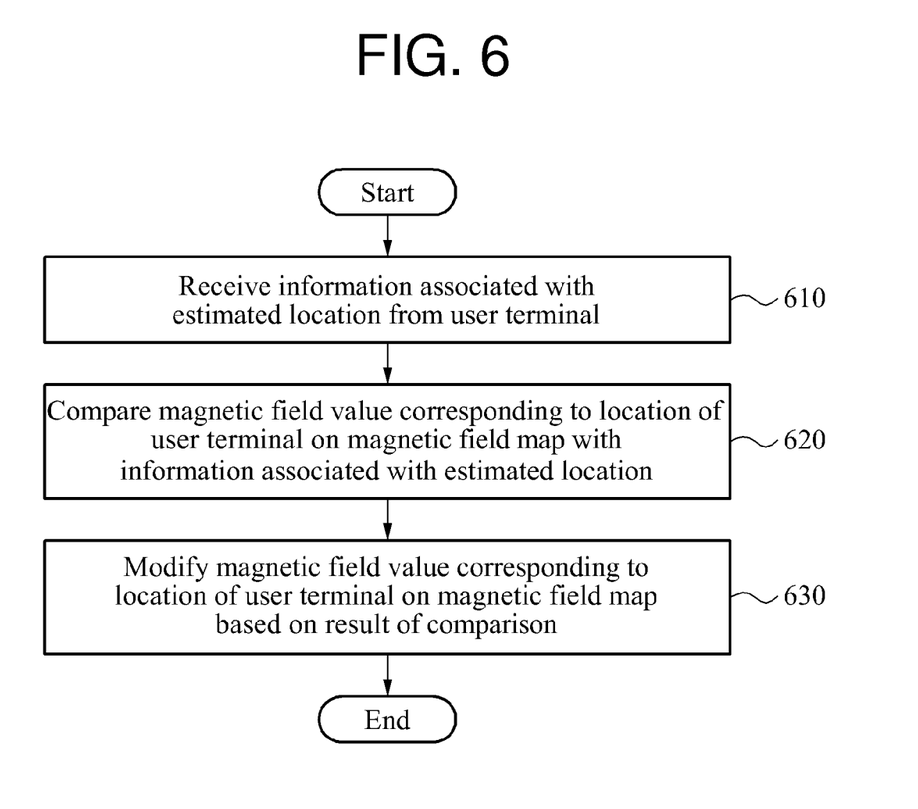
FIG. 6 is a flowchart illustrating an example of a process of performing a method of modifying a magnetic field map in a server.

FIG. 6 is a flowchart illustrating an example of a process of performing a method of modifying a magnetic field map in a server. Referring to FIG. 6, in 610, a server receives a magnetic field value measured at a location of the user terminal and information associated with a location estimated based on the magnetic field value from a user terminal.

The server modifies a magnetic field map using the measured magnetic field value and the information associated with the estimated location.

More particularly, in 620, the server compares a magnetic field value corresponding to the location of the user terminal on the magnetic field map with the information associated with the estimated location.

Also, in 630, the server modifies the magnetic field value corresponding to the location of the user terminal on the magnetic field map based on a result of the comparison.

Figure 7:
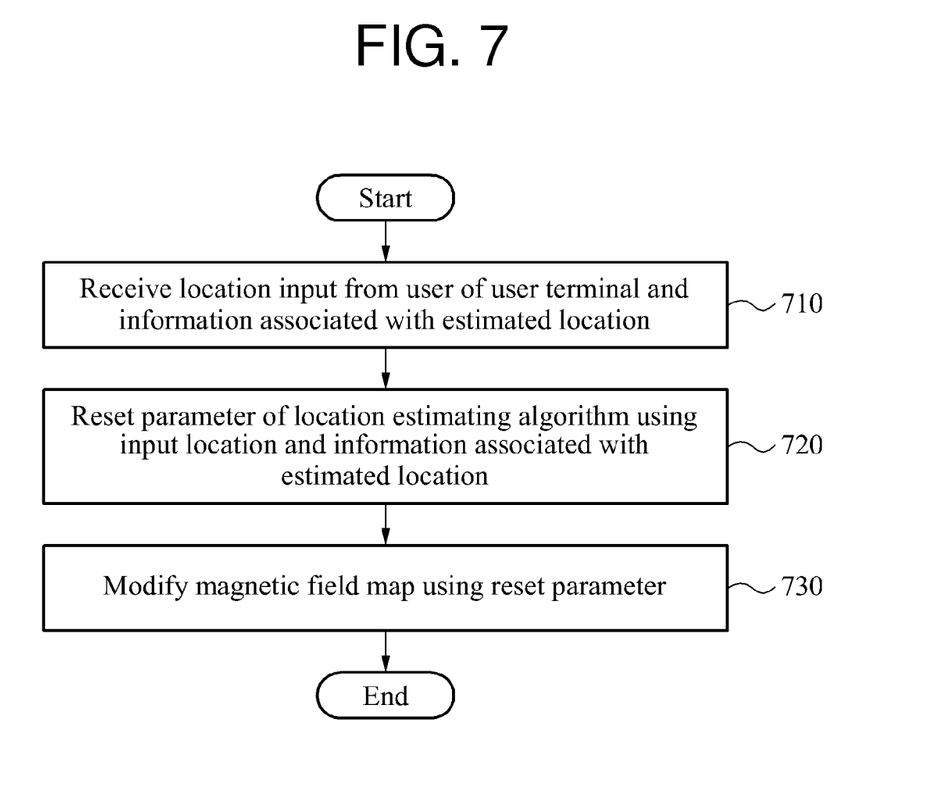
FIG. 7 is a flowchart illustrating another example of a process of performing a method of modifying a magnetic field map in a server.

FIG. 7 is a flowchart illustrating another example of a process of performing a method of modifying a magnetic field map in a server. Referring to FIG. 7, in 710, a server receives, from a user terminal, a location that is input by a user of the user terminal and a measured magnetic field value.

In 720, the server resets a parameter of a location estimating algorithm used for estimating a location of the user terminal on a magnetic field map using the location that is input by the user of the user terminal and the measured magnetic field value.

A noise of the magnetic field value may differ according to an estimation point due to environmental changes. Accordingly, an accuracy of the magnetic field map may be increased, and the location of the user terminal may be determined more accurately, by resetting the parameter of the location estimating algorithm using the input location and the measured magnetic field value.

The "location estimating algorithm" may be an algorithm to estimate a location of a terminal using the magnetic field map, and may include, for example, any one or any combination of a Kalman filter, a particle filter, a Markov localization, and similar algorithms, all of which are well known to one of ordinary skill in the art.

The "parameter" of the location estimating algorithm may be a variable used for estimating or calculating the location of the terminal in the location estimating algorithm, and may include, for example, a Kalman filter coefficient, a particle filter coefficient, a similar coefficient, all of which are well known to one of ordinary skill in the art.

For example, in 720, the server may reset the parameter of the location estimating algorithm via a method of changing a Gaussian variance, a gyroscope noise change, or a similar method that applies a weight to particles in a particle filter using the input location and the measured magnetic field value.

In 730, the server modifies and supplements the magnetic field map using the reset parameter. For example, the server may recreate the magnetic field map using the reset parameter.

Figure 8:
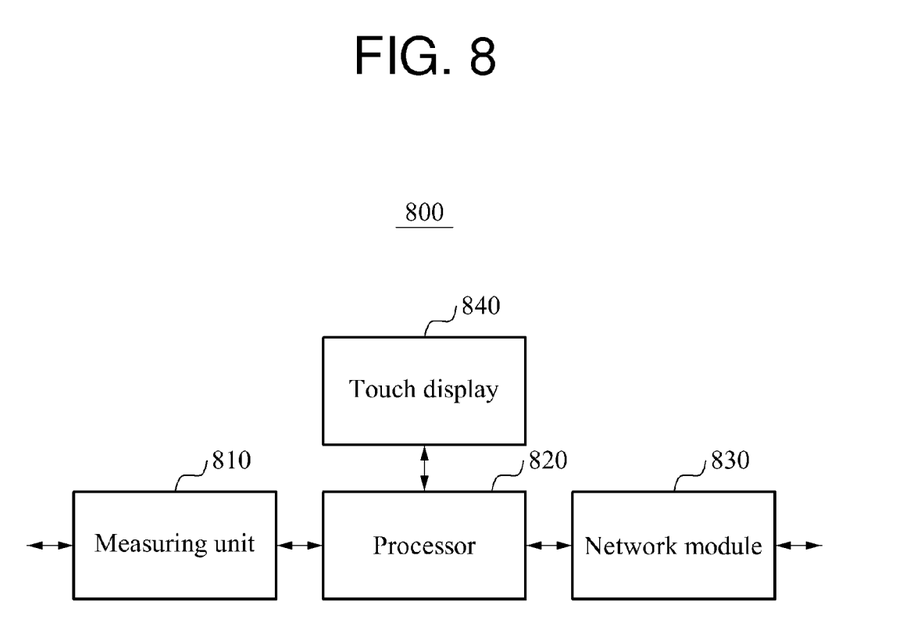
FIG. 8 is a block diagram illustrating an example of a user terminal for modifying a magnetic field map.

FIG. 8 is a block diagram illustrating an example of a user terminal for modifying a magnetic field map. Referring to FIG. 8, the user terminal 800 includes a measuring unit 810, a processor 820, a network module 830, and a touch display 840.

The measuring unit 810 measures a magnetic field value at a location of the user terminal 800.

The processor 820 estimates the location of the user terminal using the measured magnetic field value, and determines whether the location of the user terminal is estimated correctly based on information associated with the estimated location.

The network module 830 transmits the measured magnetic field value and the information associated with the estimated location to a server.

The touch display 840 displays the estimated location of the user terminal and receives an input of the location of the user terminal from a user.

The network module 830 transmits the location of the user terminal that is input by the touch display 840 and the information associated with the estimated location to the server.

Figure 9:
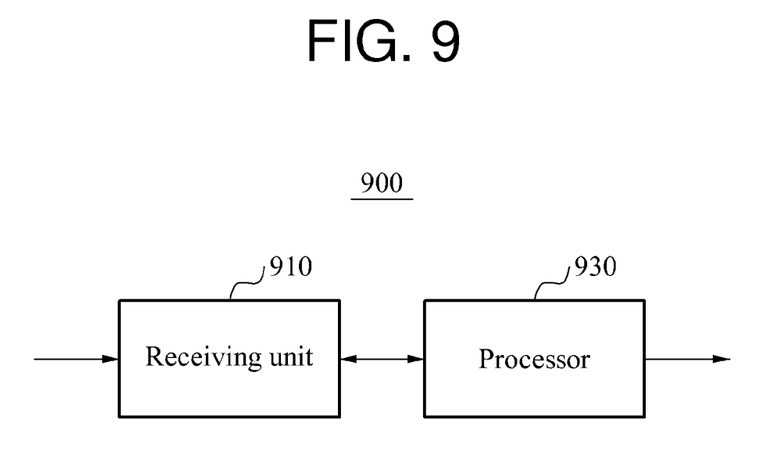
FIG. 9 is a block diagram illustrating an example of a server for modifying a magnetic field map.

FIG. 9 is a block diagram illustrating an example of a server for modifying a magnetic field map. Referring to FIG. 9, the server for modifying the magnetic field map, hereinafter referred to as a "server" 900, includes a receiving unit 910 and a processor 930.

The receiving unit 910 receives, from a user terminal, information associated with an estimated location of the user terminal estimated based on a magnetic field value measured at a location of the user terminal.

The processor 930 modifies a magnetic field map using the information associated with the estimated location. The processor 930 compares a magnetic field value corresponding to the location of the user terminal on the magnetic field map with the information associated with the estimated location, and based on a result of the comparison, the processor 930 modifies the magnetic field value corresponding to the location of the user terminal on the magnetic field map.

The processor 930 may reset a parameter of a location estimating algorithm used for estimating the location of the user terminal on the magnetic field map using the information associated with the estimated location.

Also, the receiving unit 910 may receive a location that is input by a user of the user terminal and the information associated with the estimated location.

The processor 930 may modify the magnetic field map using the location that is input by the user of the user terminal and the information associated with the estimated location.

In addition, the processor 930 may reset the parameter of the location estimating algorithm used for estimating the location of the user terminal on the magnetic field map using the location that is input by the user of the user terminal and the information associated with the estimated location.

The user terminal 110, the server 130, the user terminal 800, the measuring unit 810, the processor 820, the network module 830, the touch display 840, the server 900, the receiving unit 910, and the processor 930 described above that perform the operations illustrated in FIGS. 2-7 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A method of estimating a location of a terminal, the method comprising:
measuring a magnetic field value at the location of the terminal using a magnetometer or a magnetic field sensor;

estimating, using a processor, the location of the terminal using the measured magnetic field value and a magnetic field value corresponding to the location of the user terminal on a three-dimensional (3D) magnetic field map,
wherein the estimating the location of the terminal comprises:
comparing a location having the measured magnetic field value and a location having a corresponding magnetic field value on the 3D magnetic field map; and
estimating a location displaying the closest value as the location of the user terminal,
determining whether the location of the terminal is estimated correctly based on whether a difference between the magnetic field value on the magnetic field map and the measured magnetic field value is greater than a threshold value;
in response to the location of the terminal being estimated incorrectly
receiving a user input of the location of the terminal, using a touch display, from a user of the terminal;
transmitting the measured magnetic field value and the user input of the location of the terminal to a server, wherein the server modifies the magnetic field map using the user input of the location of the terminal and the measured magnetic field value; and
in response to the location of the terminal being estimated correctly,
transmitting the measured magnetic field value and the estimated location of the terminal, wherein the server modifies the magnetic field map using the estimated location of the terminal and the measured magnetic field value.

2. The method of claim 1, further comprising requesting, using the processor, permission to collect the information associated with the estimated location when the difference between the magnetic field value on the magnetic field map and the measured magnetic field value is greater than the threshold value.

3. The method of claim 1, further comprising:
determining, using the processor, that the terminal does not store a magnetic field map comprising the location of the terminal;
requesting a map server for the magnetic field map comprising the location of the terminal; and
receiving the magnetic field map from the map server in response to the request.

4. The method of claim 3, wherein the estimating of the location of the terminal comprises estimating the location of the terminal using the measured magnetic field value and a magnetic field value corresponding to the location of the terminal on the received magnetic field map.

5. The method of claim 1, wherein the estimating of the location of the terminal comprises receiving, from the server, a location of the terminal estimated based on the measured magnetic field value.

6. The method of claim 1, wherein the transmitting of the measured magnetic field value and the user input of the location of the terminal to the server comprises requesting permission from the user of the terminal to transmit the measured magnetic field value and the user input of the location of the terminal to the server.

7. The method of claim 1, further comprising providing, using the processor, a reward for transmitting the user input of the location of the terminal to the server.

8. A non-transitory computer-readable medium storing instructions that, when executed by a processor, cause the processor to perform the method of claim 1.

9. A terminal for estimating a location of the terminal, the terminal comprising:
a measuring unit configured to measure a magnetic field value at a location of the terminal;
a processor configured to:
estimate the location of the terminal using the measured magnetic field value and a magnetic field value corresponding to the location of the user terminal on a three-dimensional (3D) magnetic field map;
compare a location having the measured magnetic field value and a location having a corresponding magnetic field value on the 3D magnetic field map; and
estimate a location displaying the closest value as the location of the user terminal,
determine whether the location of the terminal is estimated correctly based on whether a difference between the magnetic field value on the magnetic field map and the measured magnetic field value is greater than a threshold value;
a touch display configured to display the estimated location of the terminal and receive a user input of the location of the terminal in response to the location of the terminal being estimated incorrectly; and
a network module
configured to transmit the measured magnetic field value and the user input of the location of the terminal to a server in response to the location of the terminal being estimated incorrectly; and
configured to transmit the measured magnetic field value and the estimated location of the terminal in response to the location of the terminal being estimated correctly,
wherein the server modifies the magnetic field map using the user input of the location of the terminal and the measured magnetic field value in response to the location of the terminal being estimated incorrectly,
wherein the server modifies the magnetic field map using the estimated location of the terminal and the measured magnetic field value in response to the location of the terminal being estimated correctly.

* * * * *